May 20, 1958  J. M. BRANDSTADTER  2,835,265
TRANSFER VALVE

Filed Nov. 16, 1955  2 Sheets-Sheet 1

INVENTOR.
JACK M. BRANDSTADTER
BY
Oscar B Brumback
ATTORNEY

May 20, 1958
J. M. BRANDSTADTER
2,835,265
TRANSFER VALVE
Filed Nov. 16, 1955
2 Sheets-Sheet 2
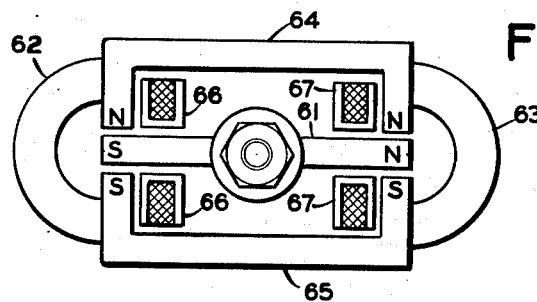
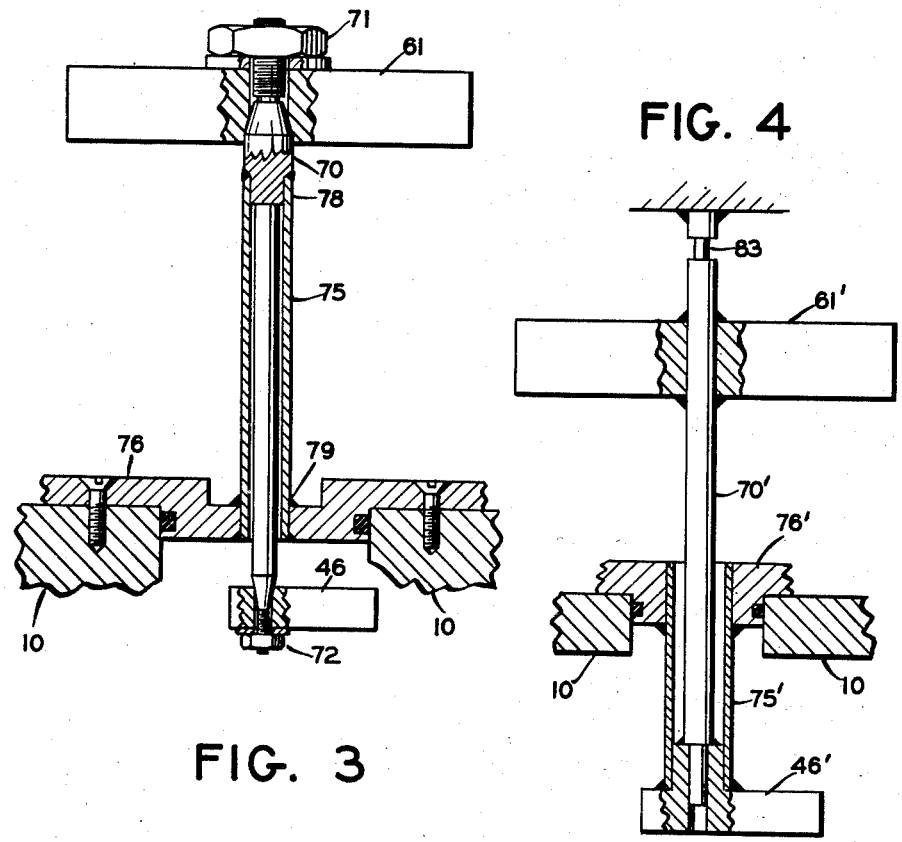
INVENTOR.
JACK M. BRANDSTADTER
BY
Oscar B. Brumback
ATTORNEY

United States Patent Office 2,835,265
Patented May 20, 1958

2,835,265

TRANSFER VALVE

Jack M. Brandstadter, Royal Oak, Mich., assignor to Bendix Aviation Corporation, Teterboro, N. J., a corporation of Delaware Application November 16, 1955, Serial No. 547,097

2 Claims. (Cl. 137—82)

This invention relates generally to transfer valves for servosystems.

The transfer valve of conventional electro-hydraulic control systems receives electrical input signals from sensing devices and correspondingly controls the flow of pressure fluid to an actuator. The input signal in one type of transfer valve operates a torque motor whose armature displaces a flapper from a normal position relative to the fluid discharge nozzle of a chamber to create a pressure in the chamber proportional to the signal. This pressure acting on the end of a valve spool positions the valve spool to control the direction and extent of fluid flow to the actuator.

An object of the present invention is to provide a transfer valve with novel means for isolating the electrically operated means from the fluid pressure operated means.

Another object is to provide novel means for centering the signal of a transfer valve for a no-signal condition by fluid pressure.

The present invention contemplates a transfer valve having a member positioned relative to inlet and exhaust pressure fluid ports by differential pressure in response to electrical signals to control an actuator, the valve being provided with novel means for isolating the electrically operated portion which responds to the signals from the pressure fluid operated portion and also for centering the member which produces the differential pressure and also provided with novel means for centering the pressure operated portion for a no-signal condition by way of fluid pressure.

The foregoing and other objects and advantages of the invention will appear more fully hereinafter from a consideration of the detailed description which follows, taken together with the accompanying drawings wherein two embodiments of the invention are illustrated by way of example. It is to be expressly understood, however, that the drawings are for the purpose of illustration and description only, and are not intended as a definition of the limits of the invention.

In the drawings wherein like parts are marked alike:

Figure 2 illustrates schematically a plan view of the torque motor with the housing removed and adapted to be used with the valve of Figure 1;

Figure 3 illustrates schematically the connection between the armature of Figure 2 and the flapper and housing of Figure 1; and Figure 4 illustrates schematically another embodiment of the connection such as shown in Figure 3.

Figure 1:
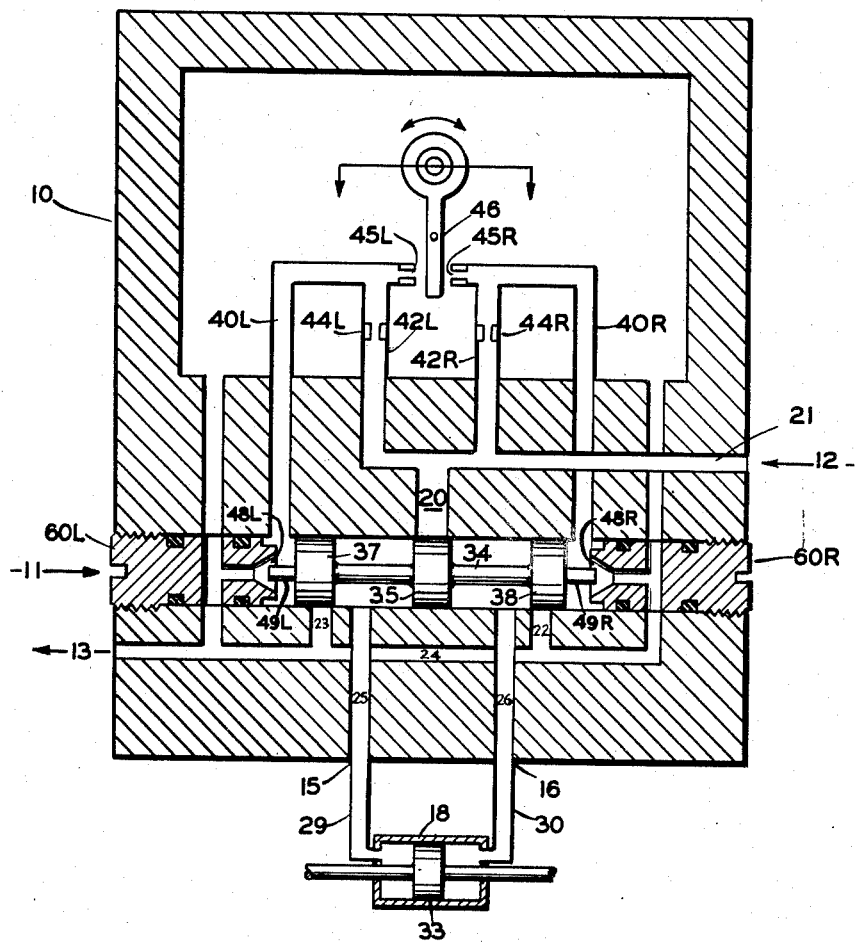
Figure 1 illustrates schematically a sectional elevational view of one embodiment of the novel valve of the present invention.

Turning now to Figure 1 in the drawing, the valve body, generally designated as 10, has a bore 11 and a plurality of ports 12, 13, 15 and 16. Port 12 is adapted to be connected to a suitable source of pressure fluid, port 13 is adapted to be connected to the exhaust or sump, and ports 15 and 16 are adapted to be connected to a suitable hydraulic actuator 18. As illustrated, ducts 20 and 21 connect bore 11 and pressure fluid port 12; ducts 22, 23 and 24 connect the bore and exhaust port 13; ducts 25 and 26 connect the bore and controlled output ports 15 and 16; and conduits 29 and 30 connect output ports 15 and 16 to the opposite ends of a suitable hydraulic ram 18 having a movable piston 33 therein.

The movement of a spool 34 in bore 11 controls the flow of pressure fluid from duct 20 to duct 25 or 26. As long as the spool is at the centered position shown, land 35 blocks the flow of fluid from input duct 20 to either duct 25 or 26, and lands 37 and 38 block the flow of fluid to exhaust ducts 22 and 23. Upon movement of the spool to the right of center, however, land 35 clears the passageway of duct 20 so that fluid can flow from this duct through duct 25 to the left face of piston 33, and the rate of fluid flow permitted depends upon the extent of movement of the spool. As the pressure fluid acting against the left face of piston 33 moves the piston to the right, the right face of the piston exhausts the fluid through conduit 30, duct 26 and the passageway of duct 22 to sump port 13. In a similar manner, a movement of spool 34 to the left causes piston 33 to move to the left.

The movement of spool 34 results from having applied thereto a differential pressure obtained from a pair of headers 40L and 40R. Since these headers may be identical, similar portions will be numbered alike but designated with L or R for left and right. Each header has an inlet and two variable outlets. The inlet is comprised of passageway 42L and 42R connecting the headers and the pressure fluid duct 21. An orifice 44L, 44R in each passageway restricts the flow of fluid to the header. One outlet is formed by nozzles 45L, 45R and flapper 46; and the other outlet is formed by conical opening 48L, 48R and spindles 49L, 49R.

It will be apparent that if the combined area of outlets 45 and 48 is greater than the area of inlets 42, there will be substantially no flow restriction, and the pressure in headers 40 will be negligible. On the other hand, if the combined area of the outlets be smaller than the area of the inlet, there will be substantial flow restriction and pressure will build up in the header proportional to the difference in areas. Normally the pressures in headers 40L and 40R are equal.

In accordance with the present invention, the areas of both outlets 45 and 48 are variable. Thus, a variation in the outlet areas change the header pressure and develop a differential pressure to act on the end face of spool 34.

Flapper 46 controls the areas of outlet 45L and 45R. Normally flapper 46 is centered so that the flow through both nozzles is equal. While the diameter of these nozzles is fixed, the movement of flapper 46 toward or away from a nozzle increases or decreases the space between the flapper and nozzle to give a greater or lesser peripheral area for the flow of fluid. Thus, as the flapper 45 is moved toward one nozzle, the flow from that nozzle is decreased while the flow from the other nozzle is increased. As a result, a differential pressure builds up in the headers and tends to move spool 34 in the direction of the lower pressure.

In accordance with the present invention the movement of spool 34 tends to equalize the pressures in the headers, since the spindles 49 at the ends of the spool coact with a conical opening in end pieces 60R and 60L to provide a flow restrictor. Thus, as spool 34 moves to the right, for example, in response to a greater differential pressure on its right face due to a displacement of flapper 46 from center, the spindle 49L moves away from the conical face 48L increasing the distance between the spindle and face to provide a greater area for the flow of pressure fluid from the header 40L to the sump, and the pressure in header 40L tends to drop. At the same time, the distance between conical opening 48R and spindle 49R decreases, and the pressure in header 40R tends to build up. As a result, the pressures in headers 40L and 40R become equal despite the displaced position of flapper 46 and the spool stops in its displaced position.

Upon a return of flapper 46 to its centered position, the pressure equilibrium existing in headers 40L and 40R is again destroyed. The pressure of header 40R tends to increase and the pressure in header 40L tends to decrease. The spool will then move to the left until the pressures in headers 40 and 41 become equal. The spool at this time is in its centered position shown. This centered position may be readily adjusted at any time by relatively threading the end stops 60 in block 10.

The torque motor for moving flapper 46 from its centered position comprises, Figure 2, an armature 61 surrounded by a pair of permanent magnets 62 and 63 spaced apart by laminated iron cores 64, 65 which hold a pair of coils 66, 67. This torque motor unit is enveloped in a suitable housing not shown. When armature 61 is in a centered position, the magnetic flux action on the armature is balanced. However, passing a direct current through coils 66, 67 increases the flux of one magnetic field and decreases the flux from the other field. The unbalance flux creates a force which deflects armature 61 angularly until this force is balanced by the load force on the shaft 70, Figure 3.

The torque motor of Figure 1 and the valve body and flapper are connected by a shaft 70, Figure 3. Shaft 70 is secured to armature 61 by nut 71 and the flapper 46 is secured to shaft 70 by nut 72. Fitted on and brazed to shaft 70 is a torsion tube 75 which is also brazed to a closure piece 76 which is fastened by suitable means to valve body 10. These brazed sections form leak-proof joints to isolate the torque motor from the pressure fluid. Also, the turning of armature 61 in response to a signal input to torque motor 31 angularly displaces the portion of tube 75 at 78 relative to the portion of the tube at 79. This torsionally stresses the tube so that when the control signal drops to zero, the torsional stress returns the flapper to a centered position.

In the operation of the device, a differential direct current input applied to the coils 66, 67 of the torque motor from a suitable amplifier (not shown), differentially changes the flux fields of the cores attached to the magnets 62, 63 creating a force to turn the armature of the motor. The turning of the armature torsionally stresses the torsional tube 75 and creates a pressure at the nozzles due to the movement of flapper 67. When this load balances the force due to the differential flux fields, the armature stops. The opening of one nozzle 45 by flapper 46 and the closing of the other nozzle creates a differential pressure in the headers 40. This differential pressure operating against the ends of spool 34 displaces the spool from center position and when the pressure in the headers is again equalized, the movement of the spool is stopped. The displacement of the spool opens the ports to and from the hydraulic ram to move the piston therein correspondingly. As the signal drops to zero, the torque exerted by the torsion tube returns the flapper to center position. This again creates a differential pressure in the headers and the difference in pressure moves the spool to a center position whereupon equilibrium is reestablished.

In Figure 4, showing another embodiment of the present invention, the fluid control arrangement of Figure 1 and the armature, coil and magnet arrangement of Figure 2 may be similar but the connecting shaft 70' is necked at 83 to the armature 61'. One end of shaft 70' is brazed to the fixed housing and the other is brazed to the flapper 46', which in turn is brazed to a torsion tube 75' which is also brazed to the closure plate 76'.

In the operation of the embodiment of Figure 4, a torque motor such as at Figure 2 is provided to rotate the armature 61' angularly in response to a control signal. The twisting of shaft 70' at neck 83 provides a torsional stress as does the twisting of torsion tube 75. When the signal drops to zero, these torsion stresses return the flapper to normal position. Thus, torsion tube 75' centers the flapper at a no-signal condition as well as isolating the torque motor from the fluid pressure in the exhaust chamber of the transfer valve body.

The foregoing has described a novel transfer valve wherein the torque motor which positions a flapper to provide a differential fluid pressure on a valve spool is isolated from the fluid pressure and is centered automatically at a no-signal condition. The spool also is centered by fluid pressure means at a no-signal condition.

Although only two embodiments of the invention have been illustrated and described in detail, it is to be expressly understood that the invention is not limited thereto. Various changes can be made in the design and arrangement of the parts without departing from the spirit and scope of the invention, as the same will now be understood by those skilled in the art.

What is claimed is:

1. A transfer valve comprising two pairs of magnetic poles of opposite polarity, an armature, and a coil encircling said armature, the ends of said armature extending beyond said coil, whereby one end is in close proximity with one pair of said poles and the opposite end is in close proximity with the other pair of said poles, said coil magnetizing said armature whereby said armature swings toward one of said poles when magnetized by a signal of one sense and swings toward the opposite pole when magnetized by a signal of opposite sense, a housing, fluid operated means including a pair of fluid discharge nozzles in said housing, control means for differentially varying the flow through said nozzles, and means responsive to said difference in fluid flow for amplifying the power due to said difference, and means connecting said armature and fluid control means for actuating the latter by the former including a shaft connecting said armature and fluid control means, a torque tube connected at one end to said shaft and at the opposite end to said housing for isolating said electrically and fluid operated means and maintaining said armature and said control means in a position centered relative to said poles and nozzles for a no-signal condition.

2. A transfer valve comprising two pairs of magnetic poles of opposite polarity, an armature, and a coil encircling said armature, the ends of said armature extending beyond said coil, whereby one end is in close proximity with one pair of said poles and the opposite end is in close proximity with the other pair of said poles, said coil magnetizing said armature in response to a signal whereby said armature swings toward one of said poles when magnetized by a signal of one sense and swings toward the opposite pole when magnetized by a signal of opposite sense, flow control means, a housing, a pair of fluid discharge nozzles in said housing, said control means differentially varying the flow through said nozzles, means actuated by said fluid flow difference for amplifying the power due to said difference, a shaft connecting said armature and flow control means for actuating the latter by the former, a torque tube connected at one end with said connecting shaft and at the opposite end with said housing for isolating said electrically and fluid operated means and adjustable means for securing said shaft to said armature and for maintaining said armature and said control means in a position centered relative to said poles and nozzles for a no-signal condition.

(References on following page)

References Cited in the file of this patent

UNITED STATES PATENTS

| | | |
|---|---|---|
| 1,992,048 | Temple | Feb. 19, 1935 |
| 2,248,322 | Annin | July 8, 1941 |
| 2,396,951 | Horstmann | Mar. 19, 1946 |
| 2,599,159 | Breedlove | June 3, 1952 |
| 2,674,232 | Mason | Apr. 6, 1954 |
| 2,675,652 | Chiappulini | Apr. 20, 1954 |
| 2,709,421 | Avery | May 31, 1955 |
| 2,738,772 | Richter | Mar. 20, 1956 |
| 2,790,427 | Carson | Apr. 30, 1957 |

OTHER REFERENCES

Moog's Publication, Control Engineering, May, 1955, page 21. Published by McGraw Hill Co., N. Y. C.